United States Patent
Swan

(10) Patent No.: US 11,585,334 B2
(45) Date of Patent: Feb. 21, 2023

(54) VAPOR RECOVERY SYSTEM AND METHOD FOR PACKING CASES AND OTHER GAS EMITTING COMPONENTS

(71) Applicant: Randy Swan, Granbury, TX (US)

(72) Inventor: Randy Swan, Granbury, TX (US)

( * ) Notice: Subject to any disclaimer, the term of this patent is extended or adjusted under 35 U.S.C. 154(b) by 308 days.

(21) Appl. No.: 17/075,177

(22) Filed: Oct. 20, 2020

(65) Prior Publication Data

US 2022/0120266 A1 Apr. 21, 2022

(51) Int. Cl.
*F04B 41/02* (2006.01)
*G01M 3/26* (2006.01)
*F04B 53/06* (2006.01)
*F04B 37/12* (2006.01)

(52) U.S. Cl.
CPC .............. *F04B 41/02* (2013.01); *F04B 37/12* (2013.01); *F04B 53/06* (2013.01); *G01M 3/26* (2013.01)

(58) Field of Classification Search
CPC .......... F04B 41/02; F04B 37/12; F04B 53/06; F04B 41/06; G01M 3/26
See application file for complete search history.

(56) References Cited

U.S. PATENT DOCUMENTS

2006/0042719 A1* 3/2006 Templet ................ F04B 53/164
141/59
2019/0093466 A1* 3/2019 Swan .................. B01D 19/0073

FOREIGN PATENT DOCUMENTS

CN 203906227 U 10/2014
KR 20140096443 A * 8/2014

* cited by examiner

*Primary Examiner* — Alexander A Mercado
*Assistant Examiner* — John M Royston
(74) *Attorney, Agent, or Firm* — Brian K. Yost; Decker Jones, PC

(57) ABSTRACT

A vapor recovery system comprises a vapor recovery unit, environmental tank, control system, vent line, environmental tank line, main vapor recovery unit inlet line, and a discharge line. The vapor recovery unit comprises a vapor recovery vessel and a vapor recovery compressor comprising a motor. The main vapor recovery unit inlet line is fluidly connected to the vapor recovery vessel. The vent line comprises a valve adapted to regulate packing case vapor flow through the vent line to the main vapor recovery unit inlet line. The environmental tank line is fluidly connected to the main vapor recovery unit inlet line. The control system is adapted to monitor a vapor recovery vessel input pressure and control the vapor recovery compressor. The control system is further adapted to control a vapor recovery vessel output to the discharge line.

20 Claims, 1 Drawing Sheet

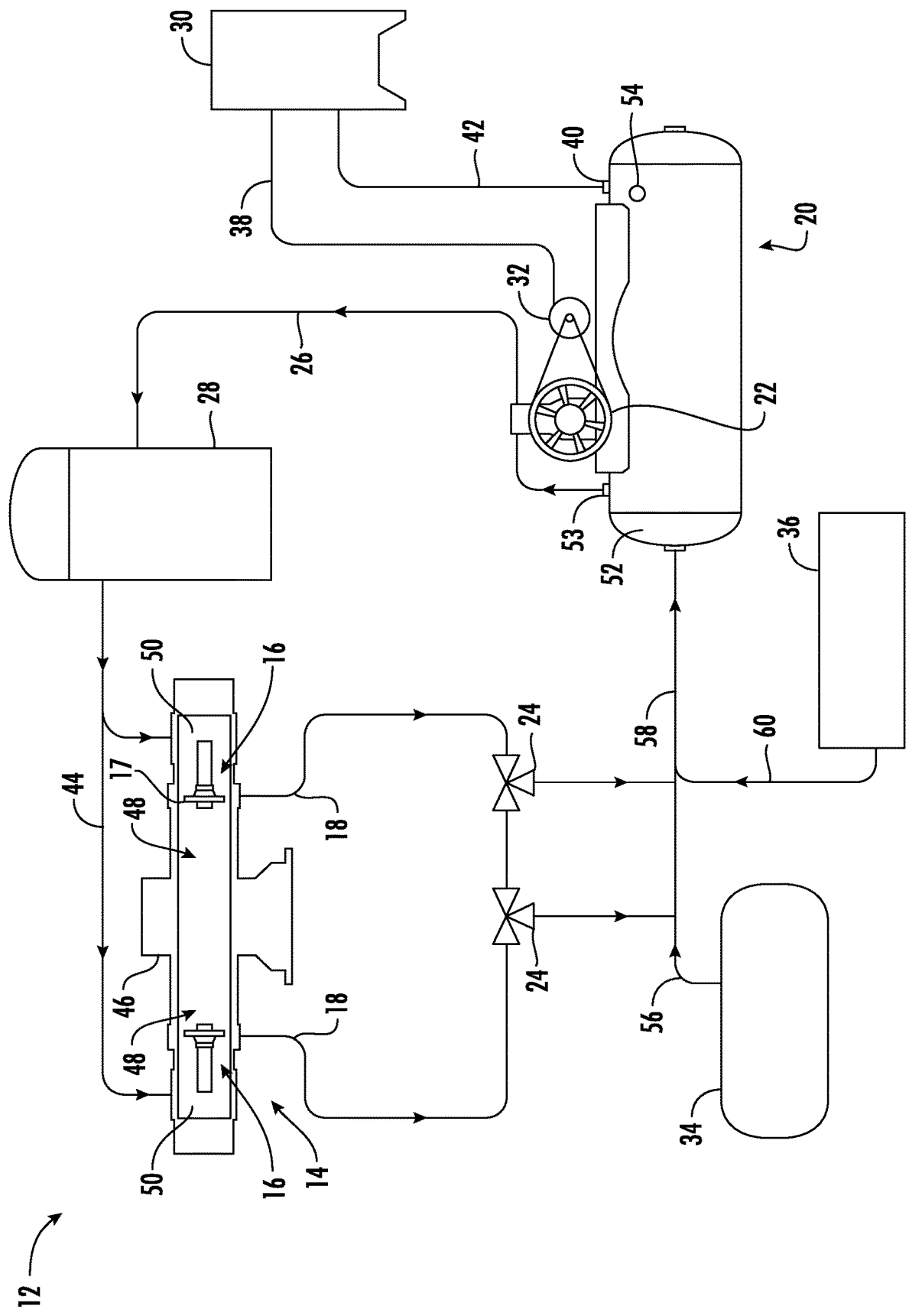

VAPOR RECOVERY SYSTEM AND METHOD FOR PACKING CASES AND OTHER GAS EMITTING COMPONENTS

BACKGROUND OF THE INVENTION

1. Field of the Invention

The present invention relates generally to a vapor recovery system and specifically to a vapor recovery system and method adapted to recover vapors from a compressor packing case and other gas emitting components.

2. Description of the Prior Art

The largest portion of gas compression in the industry is done by double-acting reciprocating compressors. A double-acting compressor utilizes a rod that passes through a piston and compresses gases on both sides such that each side of the piston has a compression and suction stroke within a cylinder on each revolution of a crankshaft. The rod, attached to a crosshead, protrudes into the crankcase of the compressor which is at significantly lower pressure (i.e. atmosphere) than the pressure inside the cylinder. A packing case assembly is installed on the rod to prevent the high-pressure gas from escaping and still allow free movement of the piston rod assembly within the cylinder to do the compression work.

Packing cases are used in virtually all double-acting reciprocating compressors. As the packing does not completely seal off the cylinder however, a small amount of gas will pass through the vent ports of the packing case as well as a small amount of lubricating oil if the case is lubricated. This vent has often been accepted as necessary and unpreventable. Thus, packing cases are a known source of fugitive gas emissions.

The prior art discloses certain efforts that have been made to contain packing case fugitive gas emissions. For example, U.S. Pat. App. No. US 2006/0042719, Templet et al. provides a gas recovery system adapted to recover gas emanating from packing seals of a gas compressor. The device comprises a jet compressor which receives high pressure motive gas, creating a vacuum that draws up the low-pressure vent gas.

By way of further example, U.S. Pat. App. No. US 2018/0100385, Elmer discloses a gas emissions recovery system adapted to receive fugitive gas emissions from a gas compressor using a double acting liquid piston compressor system, to pressurize the emissions. U.S. Pat. App. No. US 2007/0151292, Heath et al discloses a gas well vapor recovery system wherein gases collected are delivered to a vacuum chamber.

What is needed is a vapor recovery system that is simple, economical to build and operate, and which permits the recovery of packing case gasses as well as other gasses emitted from other components and a method that permits a user to determine the need to replace packing case packing.

SUMMARY OF THE INVENTION

The vapor recovery system (VRS) of the preferred embodiment generally comprises a reciprocating compressor comprising packing cases, packing vent lines leading from the reciprocating compressor to a main vapor recovery unit inlet line leading into a vapor recovery unit comprising a vapor recovery vessel and a vapor recovery compressor comprising a motor. The VRS of the preferred embodiment further comprises one or more valves adapted to regulate flow from the reciprocating compressor to the vapor recovery unit; a discharge line leading from the vapor recovery unit to sales or a reciprocating compressor inlet vessel. The reciprocating compressor inlet vessel is adapted to supply the reciprocating compressor through inlet lines.

The VRS of the preferred embodiment further comprises a control system. The control system of the preferred embodiment is a programmable logic controller (PLC) based controller adapted to monitor input devices and make program-based decisions to control output devices. The control system is adapted to monitor and control the vapor recovery unit and/or the motor which in certain embodiments, comprises a variable frequency drive communicatively linked to the control system via a motor control. In certain embodiments, the VRS further comprises an environmental tank and/or other components which may emit gas such as dump valves, regulators, pumps, and the like. The vapor recovery unit further comprises a pressure sensor/transducer adapted to transmit inlet pressure readings to the control system via communication conduit.

In operation, gas is fed from the reciprocating compressor inlet vessel through the inlet lines into the reciprocating compressor. The reciprocating compressor comprises a frame with packing cases positioned within throws. Conventional reciprocating compressor frames typically comprise between one to six throws, which will have a packing case within each throw having a cylinder installed. Gas accumulating within the packing cases is directed downstream towards the vapor recovery unit through the respective packing vent lines (which in prior art reciprocating compressors are normally open to atmosphere). The valves are positioned between the reciprocating compressor and vapor recovery unit. In the preferred embodiment, the valves are three-way ball valves installed on each separate packing vent line and are adapted to permit an operator to open the packing vent line back to atmosphere to physically check the rate of vent flow from the packing case.

The vapor recovery unit further comprises required sensors and hardware to operate the vapor recovery vessel, the vapor recovery compressor, and the motor. The vapor recovery vessel of the preferred embodiment comprises a controllable relief valve adapted to be configured to a setting that will permit gas to vent to atmosphere should a shutdown occur in the vapor recovery unit. This setting can be adjusted based on the operator's preference in order, for example, to maintain a packing case vent pressure within accepted operating parameters. These accepted operating parameters may be determined, for example by the reciprocating compressor manufacturer. In conventional reciprocating compressors, the acceptable packing case vent pressure is typically below 5 pounds per square inch gauge pressure (PSIG).

The vapor recovery compressor of the preferred embodiment is a conventional and commercially available small reciprocating or rotary type compressor adapted to operate with very low inlet pressure as well as low discharge pressure such that recovered gas can be routed back into the low pressure side of the VRS or the sales line.

The pressure sensor/transducer is used to monitor inlet pressure to the vapor recovery vessel and provide such inlet pressure information to the control system. The control system further comprises the motor control. With such configuration, the control system is structured and arranged to activate the vapor recovery unit, deactivate the vapor recovery unit, and, in embodiments comprising a variable frequency drive (VFD), alter the speed of the motor. Thus, the control system monitors inlet pressures, starts, stops, and, in case of VFD, alters the speed of the motor to maintain a low pressure set point in the vapor recovery vessel as determined by the operator. In the preferred embodiment, this low pressure set point is approximately 0.0625 PSIG (1 oz.). The control system is also adapted to monitor faults, run time efficiencies and alarms when an increase in flow is registered which may suggest a leaking or worn packing case causing excess vent. The operator can then open the 3-way valves individually to physically check which packing case is venting excessively and repair the packing case as needed to prevent excessive venting. This arrangement also prevents unnecessary repair on packing cases that are working properly but are past a scheduled rebuild cycle.

After recovering gas from the packing cases, the vapor recovery unit is adapted to discharge such gas through the discharge line to either sales or the reciprocating compressor inlet vessel or wherever else an operator might require in order to prevent venting to atmosphere.

In other embodiments, the VRS comprises an environmental tank. Environmental tanks or "pots" are commonly used in oil and gas operations near skids. Oil and water on such skids are gravity fed to the environmental tank. Conventionally, when the environmental tank becomes full, the tank is charged with pressurized natural gas to discharge the oil/water slurry into holding tanks. Conventionally, the charge gas is vented to the atmosphere. However, in the VRS of the present disclosure, the environmental tank gas is directed from the environmental tank through an environmental tank line into the main vapor recovery unit inlet line. Thus, the environmental tank gas can be recovered in similar manner as the packing case gas.

In other embodiments, the VRS comprises other components which emit gas which might ordinarily be vented to the atmosphere. A component vent line leading from such other components is provided. This component vent line feeds into the main vapor recovery unit inlet line. Thus, the component gas can be recovered in similar manner as the packing case gas.

A method of determining whether packing within a packing case of a reciprocal compressor is in need of replacement and replacing the packing is also provided. The method of the preferred embodiment comprises the steps of providing a vapor recovery system comprising a reciprocating compressor, a reciprocating compressor inlet vessel, a vapor recovery unit, a control system, a vent line, a main vapor recovery unit inlet line, and a discharge line, the vent line comprising a valve; the vapor recovery unit comprising a vapor recovery vessel and a vapor recovery compressor comprising a motor, the main vapor recovery unit inlet line being fluidly connected to the vapor recovery vessel; the packing case fluidly connected to the vent line; the vent line valve being adapted to regulate a flow of packing case vapor through the vent line to the main vapor recovery unit inlet line or to atmosphere; the control system being adapted to monitor a vapor recovery vessel input pressure and a flow through the vapor recovery vessel, and to further control the vapor recovery compressor; and the control system being further adapted to control a vapor recovery vessel output to the discharge line, the discharge line being fluidly connected to the reciprocating compressor inlet vessel, the reciprocating compressor inlet vessel fluidly connected to the reciprocating compressor; using the control system, determining whether the flow of packing case vapor potentially exceeds an acceptable threshold; opening the vent line valve to atmosphere to determine whether the packing case vapor flow exceeds the acceptable threshold; and replacing the packing in the packing case upon determining that the packing case vapor flow exceeds the acceptable threshold.

BRIEF DESCRIPTION OF THE DRAWING

FIG. 1 is a block diagram depicting the vapor recovery unit for packing cases and other gas emitting components, in accordance with a preferred embodiment.

DESCRIPTION OF THE PREFERRED EMBODIMENT

Referring to FIG. 1, there is shown the vapor recovery system for packing cases and other gas emitting components (VRS) 12 in accordance with a preferred embodiment. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Referring to the FIGURE, the VRS 12 of the preferred embodiment generally comprises a reciprocating compressor 14 comprising packing cases 16, packing vent lines 18 leading from the reciprocating compressor 14 to a main vapor recovery unit inlet line 58 leading into a vapor recovery unit 20 comprising a vapor recovery vessel 52 and a vapor recovery compressor 22 comprising a motor 32. The VRS 12 of the preferred embodiment further comprises one or more valves 24 adapted to regulate flow from the reciprocating compressor 14 to the vapor recovery unit 20; a discharge line 26 leading from the vapor recovery unit 20 to sales or a reciprocating compressor inlet vessel 28. The reciprocating compressor inlet vessel 28 is adapted to supply the reciprocating compressor 14 through inlet lines 44.

The VRS 12 of the preferred embodiment further comprises a control system 30. The control system 30 of the preferred embodiment is a programmable logic controller (PLC) based controller adapted to monitor input devices and make program-based decisions to control output devices. In the preferred embodiment control system 30 is adapted to monitor and control the vapor recovery unit 20 and/or the motor 32 which in certain embodiments, comprises a variable frequency drive 32 communicatively linked to the control system 30 via motor control 38. In certain embodiments, the VRS 12 further comprises an environmental tank 34 and/or other components 36 which may emit gas such as dump valves, regulators, pumps, and the like. The vapor recovery unit 20 further comprises a pressure sensor/transducer 40 adapted to transmit inlet pressure readings to the control system 30 via communication conduit. The vapor recovery unit 20 further comprises a conventional and commercially available flow meter 53 adapted to measure and to transmit flow volume readings to the control system 30 via communication conduit 42. Such flow volume readings can be of flow entering the vapor recovery vessel 52 and/or exiting the vapor recovery vessel 52. Communication conduit 42 can be a physical conduit or wireless conduit or other suitable conventional and commercially available transmission conduit 42 well known in the art.

In operation, gas is fed from the reciprocating compressor inlet vessel 28 through the inlet lines 44 into the reciprocating compressor 14. The reciprocating compressor 14 comprises a frame 46 with packing cases 16 positioned within throws 48. Conventional reciprocating compressor frames 46 typically comprise between one to six throws 48, which will have a packing case 16 within each throw having a cylinder 50 installed. Gas accumulating within the packing cases 16 is directed downstream towards the vapor recovery unit 20 through the respective packing vent lines 18 (which in prior art reciprocating compressors are normally open to atmosphere). The valves 24 are positioned between the reciprocating compressor 14 and vapor recovery unit 20. In the preferred embodiment, the valves 24 are three-way ball valves 24 installed on each separate packing vent line 18 and are adapted to permit an operator to open the packing vent line 18 back to atmosphere to physically check the rate of vent flow from the packing case 16.

The vapor recovery unit 20 further comprises required sensors and hardware to operate the vapor recovery vessel 52, the vapor recovery compressor 22, and the motor 22. The vapor recovery vessel 52 of the preferred embodiment comprises a controllable relief valve 54 adapted to be configured to a setting that will permit gas to vent to atmosphere should a shutdown occur in the vapor recovery unit 20. This setting can be adjusted based on the operator's preference in order, for example, to maintain a packing case 16 vent pressure within accepted operating parameters. These accepted operating parameters may be determined, for example by the reciprocating compressor 14 manufacturer. In conventional reciprocating compressors 14, the acceptable packing case 16 vent pressure is typically below 5 pounds per square inch gauge pressure (PSIG).

The vapor recovery compressor 22 of the preferred embodiment is a conventional and commercially available small reciprocating or rotary type compressor adapted to operate with very low inlet pressure as well as low discharge pressure such that recovered gas can be routed back into the low pressure side of the VRS 12 or the sales line 26.

The pressure sensor/transducer 40 is used to monitor inlet pressure to the vapor recovery vessel 52 and provide such inlet pressure information to the control system 30. The control system 30 further comprises the motor control 38. With such configuration, the control system 30 is structured and arranged to, among other things, activate the vapor recovery unit 20, deactivate the vapor recovery unit 20, and, in embodiments comprising a variable frequency drive (VFD) 32, alter the speed of the motor 32. Thus, the control system 30, for example, monitors inlet pressures, flow rates, starts, stops, and, in case of a VFD, alters the speed of the motor 32 to, for example, maintain a low pressure set point in the vapor recovery vessel 52 as determined by the operator, and to maintain operation within certain pressure parameters. In the preferred embodiment, this low pressure set point (stop setting) is approximately 1 oz (0.0625 PSIG). In the preferred embodiment, the system 12 is controlled such that an operating input pressure VFD set point is 3 oz (0.1875 PSIG) and has a start setting of 5 oz. (0.3125 PSIG). The relief valve 54 of the preferred embodiment is weighted and activates at 12 oz. (0.75 PSIG) when, for example, the vapor recovery unit 20 is shut off or flow is altered for any reason.

The control system 30 is also adapted to monitor faults, run time efficiencies and alarms when, for example, an increase in flow is registered (as determined, for example by pressure readings and/or flow rate readings) which may suggest a leaking or worn packing case 16 causing excess vent from the packing case. The operator can then open the 3-way valves 24 individually to physically check which packing case 16 is venting excessively and repair the packing case 16 as needed to prevent excessive venting. This arrangement also prevents unnecessary repair on packing cases 16 that are working properly but are past a scheduled rebuild cycle.

After recovering gas from the packing cases 16, the vapor recovery unit 20 is adapted to discharge such gas through the discharge line 26 to either sales or the reciprocating compressor inlet vessel 28 or wherever else an operator might require in order to prevent venting to atmosphere.

In other embodiments, the VRS 12 comprises an environmental tank 34. In such embodiments, environmental tank 34 gas is directed from the environmental tank 34 through an environmental tank line 56 into the main vapor recovery unit inlet line 58. Thus, the environmental tank 34 gas can be recovered in similar manner as the packing case 16 gas.

In other embodiments, the VRS 12 comprises other components 36 which emit gas which might ordinarily be vented to the atmosphere. A component vent line 60 leading from such other components 36 is provided. This component vent line 60 feeds into the main vapor recovery unit inlet line 58. Thus, the component 34 gas can be recovered in similar manner as the packing case 16 gas.

A method of determining whether packing 17 within a packing case 16 of a reciprocal compressor 14 is in need of replacement and replacing the packing 17 is also provided. The method of the preferred embodiment comprises the steps of providing a vapor recovery system 12 comprising a reciprocating compressor 14, a reciprocating compressor inlet vessel 28, a vapor recovery unit 20, a control system 30, a vent line 18, a main vapor recovery unit inlet line 58, and a discharge line 26, the vent line 18 comprising a valve 24; the vapor recovery unit 20 comprising a vapor recovery vessel 52 and a vapor recovery compressor 22 comprising a motor 32, the main vapor recovery unit inlet line 58 being fluidly connected to the vapor recovery vessel 52; the packing case 16 fluidly connected to the vent line 18; the vent line valve 24 being adapted to regulate a flow of packing case vapor through the vent line 18 to the main vapor recovery unit inlet line or to atmosphere; the control system 30 being adapted to monitor a vapor recovery vessel input pressure and a flow through the vapor recovery vessel 52, and to further control the vapor recovery compressor 22; and the control system 30 being further adapted to control a vapor recovery vessel output to the discharge line 26, the discharge line 26 being fluidly connected to the reciprocating compressor inlet vessel 28, the reciprocating compressor inlet vessel 28 fluidly connected to the reciprocating compressor; using the control system 30, determining whether the flow of packing case vapor potentially exceeds an acceptable threshold; opening the vent line valve 24 to atmosphere to determine whether the packing case vapor flow exceeds the acceptable threshold; and replacing the packing 17 in the packing case 16 upon determining that the packing case vapor flow exceeds the acceptable threshold.

The foregoing disclosure and showings made in the drawing are merely illustrative of the principles of this invention and are not to be interpreted in a limiting sense.

I claim:

1. A vapor recovery system comprising:
a vapor recovery unit, an environmental tank, a control system, a vent line, an environmental tank line, a main vapor recovery unit inlet line, and a discharge line;
the vapor recovery unit comprising a vapor recovery vessel and a vapor recovery compressor comprising a motor, the main vapor recovery unit inlet line being fluidly connected to the vapor recovery vessel;
the vent line comprising a valve adapted to regulate a flow of packing case vapor through the vent line to the main vapor recovery unit inlet line;
the environmental tank line being fluidly connected to the main vapor recovery unit inlet line;
the control system being adapted to monitor a vapor recovery vessel input pressure and control the vapor recovery compressor; and
the control system being further adapted to control a vapor recovery vessel output to the discharge line.

2. The vapor recovery system of claim 1, wherein the vent line valve comprises a three-way valve adapted to selectively divert flow from the vent line to atmosphere.

3. The vapor recovery system of claim 1, the motor comprising a variable frequency drive, the control system being adapted to alter a speed of the motor.

4. The vapor recovery system of claim 1, the input pressure being above zero PSIG and at or below one PSIG.

5. The vapor recovery system of claim 1, the input pressure being above zero PSIG and at or below five PSIG.

6. The vapor recovery system of claim 1, the vapor recovery vessel comprising a controllable relief valve.

7. The vapor recovery system of claim 6, the controllable relief valve configured to permit gas to vent to atmosphere in the event of a shutdown of the vapor recovery unit.

8. The vapor recovery system of claim 6, the controllable relief valve configured to permit gas to vent to atmosphere in the event of a packing case vent pressure exceeds a predetermined packing case vent pressure amount.

9. The vapor recovery system of claim 8, wherein the predetermined packing case vent pressure amount is five PSIG.

10. The vapor recovery system of claim 1, further comprising other gas emitting components and comprising one or more component vent lines, the one or more component vent lines leading from the respective other gas emitting components to the main vapor recovery unit inlet line.

11. A vapor recovery system comprising:
a reciprocating compressor, a reciprocating compressor inlet vessel, a vapor recovery unit, an environmental tank, a control system, a vent line, an environmental tank line, a main vapor recovery unit inlet line, and a discharge line, the vent line comprising a valve;
the vapor recovery unit comprising a vapor recovery vessel and a vapor recovery compressor comprising a motor, the main vapor recovery unit inlet line being fluidly connected to the vapor recovery vessel;
the reciprocating compressor comprising a packing case fluidly connected to the vent line;
the vent line valve being adapted to regulate a flow of packing case vapor through the vent line to the main vapor recovery unit inlet line;
the environmental tank line being fluidly connected to the main vapor recovery unit inlet line;
the control system being adapted to monitor a vapor recovery vessel input pressure and control the vapor recovery compressor; and
the control system being further adapted to control a vapor recovery vessel output to the discharge line, the discharge line being fluidly connected to the reciprocating compressor inlet vessel, the reciprocating compressor inlet vessel fluidly connected to the reciprocating compressor.

12. The vapor recovery system of claim 11, wherein the vent line valve comprises a three-way valve adapted to selectively divert flow from the vent line to atmosphere.

13. The vapor recovery system of claim 11, the motor comprising a variable frequency drive, the control system being adapted to alter a speed of the motor.

14. The vapor recovery system of claim 11, he input pressure being above zero PSIG and at or below one PSIG.

15. The vapor recovery system of claim 11, the input pressure being above zero PSIG and at or below five PSIG.

16. The vapor recovery system of claim 11, the vapor recovery vessel comprising a controllable relief valve.

17. The vapor recovery system of claim 16, the controllable relief valve configured to permit gas to vent to atmosphere in the event of a shutdown of the vapor recovery unit.

18. The vapor recovery system of claim 16, the controllable relief valve configured to permit gas to vent to atmosphere in the event of a packing case vent pressure exceeds a predetermined packing case vent pressure amount.

19. The vapor recovery system of claim 18, wherein the predetermined packing case vent pressure amount is five PSIG.

20. A method of determining whether packing within a packing case of a reciprocal compressor is in need of replacement and replacing the packing, the method comprising the steps of:
providing a vapor recovery system comprising:
a reciprocating compressor, a reciprocating compressor inlet vessel, a vapor recovery unit, a control system, a vent line, a main vapor recovery unit inlet line, and a discharge line, the vent line comprising a valve;
the vapor recovery unit comprising a vapor recovery vessel and a vapor recovery compressor comprising a motor, the main vapor recovery unit inlet line being fluidly connected to the vapor recovery vessel;
the packing case fluidly connected to the vent line;
the vent line valve being adapted to regulate a flow of packing case vapor through the vent line to the main vapor recovery unit inlet line or to atmosphere;
the control system being adapted to monitor a vapor recovery vessel input pressure and a flow through the vapor recovery vessel, and to further control the vapor recovery compressor; and
the control system being further adapted to control a vapor recovery vessel output to the discharge line, the discharge line being fluidly connected to the reciprocating compressor inlet vessel, the reciprocating compressor inlet vessel fluidly connected to the reciprocating compressor;
using the control system, determining whether the flow of packing case vapor potentially exceeds an acceptable threshold;

opening the vent line valve to atmosphere to determine whether the packing case vapor flow exceeds the acceptable threshold; and replacing the packing in the packing case upon determining that the packing case vapor flow exceeds the acceptable threshold.

\* \* \* \* \*